US007158844B1

(12) United States Patent
Cancilla

(10) Patent No.: US 7,158,844 B1
(45) Date of Patent: Jan. 2, 2007

(54) CONFIGURABLE SURROUND SOUND SYSTEM

(76) Inventor: Paul Cancilla, 11 Church Street West #805, Brampton, Ontario (CA) L6X 4J7

( * ) Notice: Subject to any disclaimer, the term of this patent is extended or adjusted under 35 U.S.C. 154(b) by 361 days.

(21) Appl. No.: 10/624,861

(22) Filed: Jul. 21, 2003

Related U.S. Application Data

(63) Continuation-in-part of application No. 09/426,150, filed on Oct. 22, 1999, now abandoned.

(51) Int. Cl.
*G06F 17/00* (2006.01)

(52) U.S. Cl. .......................... 700/94; 381/303; 381/61

(58) Field of Classification Search .................. 700/94; 381/17–24, 106–107, 119, 182, 61, 303, 307, 381/310; 712/35, 33, 430; 715/727
See application file for complete search history.

(56) References Cited

U.S. PATENT DOCUMENTS 5,136,650 A 8/1992 Griesinger
5,208,421 A 5/1993 Lisle et al.
5,212,733 A * 5/1993 DeVitt et al. ............... 381/119
5,402,501 A * 3/1995 Silfvajt et al. .............. 381/119
5,524,054 A 6/1996 Spille
5,666,424 A 9/1997 Fosgate et al.
5,689,570 A 11/1997 Taylor
5,792,971 A * 8/1998 Timis et al. .................. 84/609
5,796,844 A 8/1998 Griesinger
5,818,941 A 10/1998 Embree
5,850,455 A 12/1998 Arnold et al.
6,009,182 A * 12/1999 Gunness ..................... 381/182
6,490,359 B1 * 12/2002 Gibson ....................... 381/119
6,798,889 B1 * 9/2004 Dicker et al. ............... 381/303
6,826,282 B1 * 11/2004 Pachet et al. ................. 381/61

* cited by examiner

*Primary Examiner*—Vivian Chin
*Assistant Examiner*—Lun-See Lao

(57) ABSTRACT

A configurable surround sound system for the creation of true 3D acoustic spatial effects. The configurable surround sound system includes a computer processing unit including a user interface means including a keyboard and a mouse, and a conventional controller unit which triggers data messages or a series of data messages to the control processing unit, and further includes a sound producing member having eight output channels such as a sound card. Sound signals are transmitted from the sound producing member to the control producing unit which is directed either by the controller unit or the user to transmit the sound signals to a mixer board and then to an amplifier which amplifies the sound signals to a plurality of speakers. Compatible computer software directs the control processing unit to send sound signals as desired.

14 Claims, 8 Drawing Sheets

CONFIGURABLE SURROUND SOUND SYSTEM

CROSS REFERENCE TO RELATED APPLICATION

This application is a continuation-in-part of application Ser. No. 09/426,150, filed Oct. 22, 1999 now abandoned.

BACKGROUND OF THE INVENTION

1. Field of the Invention

The present invention relates to a spatial acoustic sequencer and more particularly pertains to a new configurable surround sound system for the creation of true 3D acoustic spatial effects.

2. Description of the Prior Art

The use of a spatial acoustic sequencer is known in the prior art. More specifically, a spatial acoustic sequencer heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,818,941; U.S. Pat. No. 5,666,424; U.S. Pat. No. 5,208,421; U.S. Pat. No. 5,524,054; U.S. Pat. No. 5,136,650; and U.S. Pat. No. 5,850,455.

While these devices fulfill their respective, particular objectives and requirements, the aforementioned patents do not disclose a new configurable surround sound system. The inventive device includes a computer processing unit including a user interface means including a keyboard and a mouse, and a conventional controller unit which triggers data messages or a series of data messages to the control processing unit, and further includes a sound producing member having eight output channels such as a sound card. Sound signals are transmitted from the sound producing member to the control producing unit which is directed either by the controller unit or the user to transmit the sound signals to a mixer board and then to an amplifier which amplifies the sound signals to a plurality of speakers. Compatible computer software directs the control processing unit to send sound signals as desired.

In these respects, the configurable surround sound system according to the present invention substantially departs from the conventional concepts and designs of the prior art, and in so doing provides an apparatus primarily developed for the purpose of the creation of true 3D acoustic spatial effects.

SUMMARY OF THE INVENTION

In view of the foregoing disadvantages inherent in the known types of a spatial acoustic sequencer now present in the prior art, the present invention provides a new configurable surround sound system construction wherein the same can be utilized for the creation of true 3D acoustic spatial effects.

The general purpose of the present invention, which will be described subsequently in greater detail, is to provide a new configurable surround sound system which has many of the advantages of a spatial acoustic sequencer mentioned heretofore and many novel features that result in a new configurable surround sound system which is not anticipated, rendered obvious, suggested, or even implied by any of the prior art a spatial acoustic sequencer, either alone or in any combination thereof.

To attain this, the present invention generally comprises a computer processing unit including a user interface means including a keyboard and a mouse, and a conventional controller unit which triggers data messages or a series of data messages to the control processing unit, and further includes a sound producing member having eight output channels such as a sound card. Sound signals are transmitted from the sound producing member to the control producing unit which is directed either by the controller unit or the user to transmit the sound signals to a mixer board and then to an amplifier which amplifies the sound signals to a plurality of speakers. Compatible computer software directs the control processing unit to send sound signals as desired.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new configurable surround sound system which has many of the advantages of a spatial acoustic sequencer mentioned heretofore and many novel features that result in a new configurable surround sound system which is not anticipated, rendered obvious, suggested, or even implied by any of the prior art a spatial acoustic sequencer, either alone or in any combination thereof.

It is another object of the present invention to provide a new configurable surround sound system which may be easily and efficiently manufactured and marketed.

It is a further object of the present invention to provide a new configurable surround sound system which is of a durable and reliable construction.

An even further object of the present invention is to provide a new configurable surround sound system which is susceptible of a low cost of manufacture with regard to both materials and labor, and which accordingly is then susceptible of low prices of sale to the consuming public, thereby making such configurable surround sound system economically available to the buying public.

Still yet another object of the present invention is to provide a new configurable surround sound system which provides in the apparatuses and methods of the prior art some of the advantages thereof, while simultaneously overcoming some of the disadvantages normally associated therewith.

Still another object of the present invention is to provide a new configurable surround sound system for the creation of true 3D acoustic spatial effects.

Yet another object of the present invention is to provide a new configurable surround sound system which includes a computer processing unit including a user interface means including a keyboard and a mouse, and a conventional controller unit which triggers data messages or a series of data messages to the control processing unit, and further includes a sound producing member having eight output channels such as a sound card. Sound signals are transmitted from the sound producing member to the control producing unit which is directed either by the controller unit or the user to transmit the sound signals to a mixer board and then to an amplifier which amplifies the sound signals to a plurality of speakers. Compatible computer software directs the control processing unit to send sound signals as desired.

Still yet another object of the present invention is to provide a new configurable surround sound system that produces true 3D acoustic effects.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
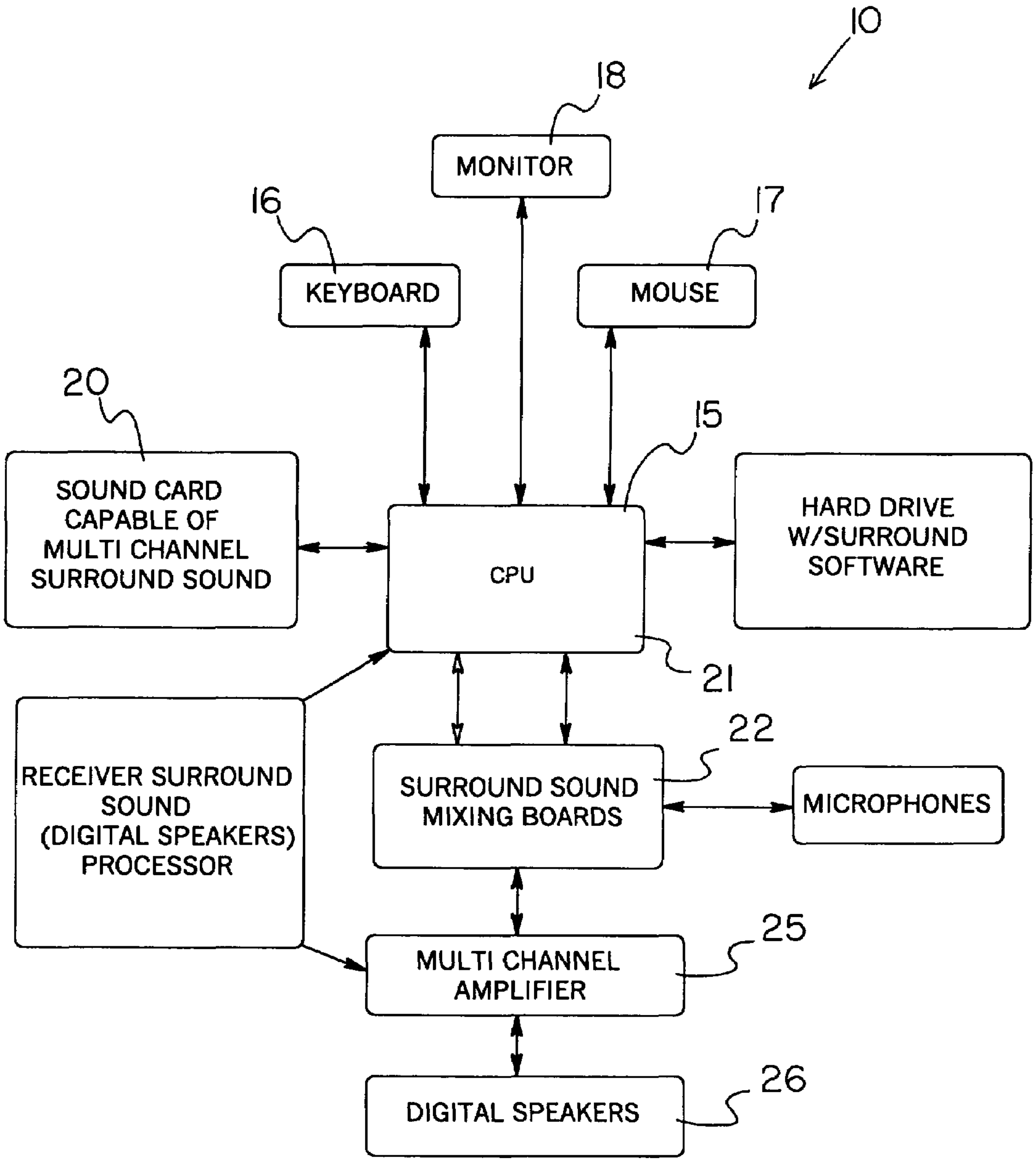
FIG. 1 is a schematic diagram of a new configurable surround sound system according to the present invention.
Figure 2:
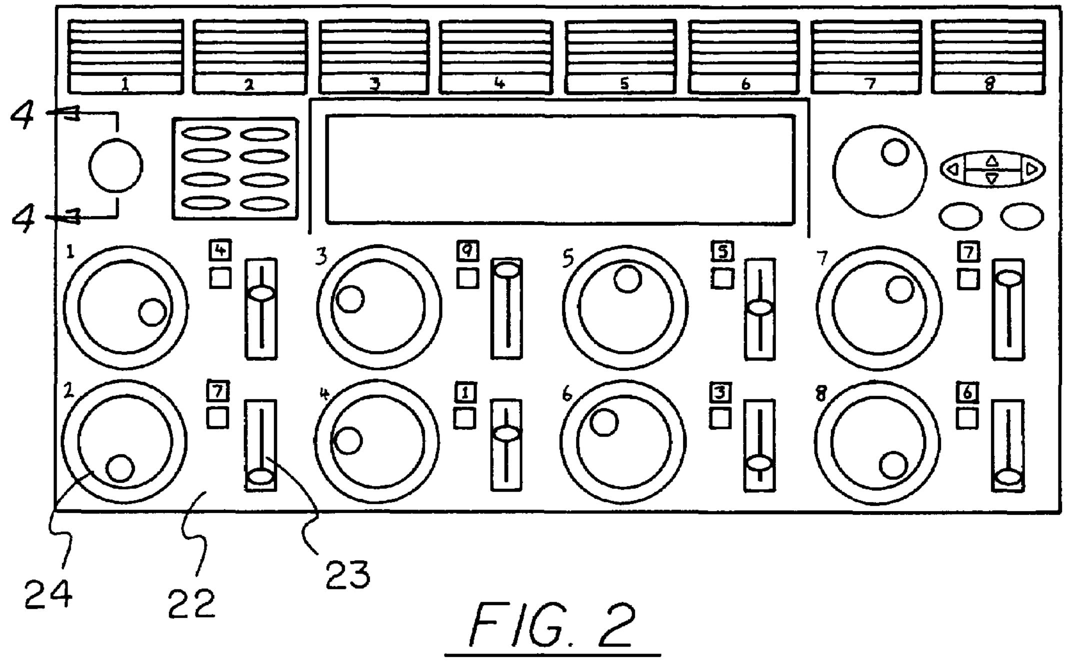
FIG. 2 is a top plan view of the mixer board of the present invention.
Figure 3:
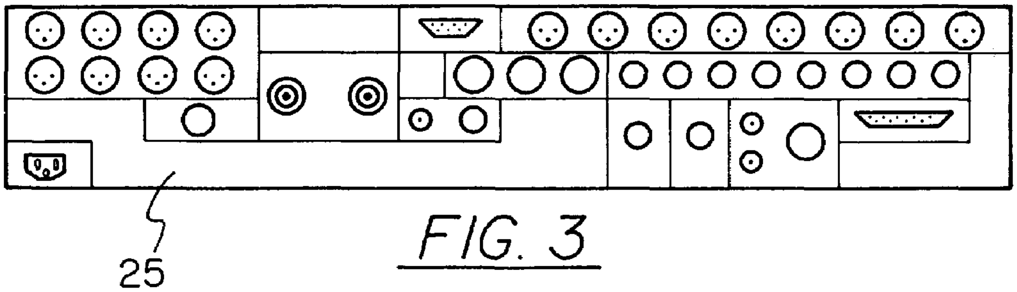
FIG. 3 is a rear elevational view the mixer board of the present invention.
Figure 4:
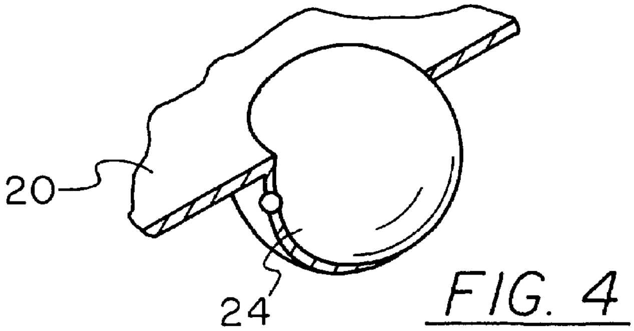
FIG. 4 is a detailed view of a dial of the mixer board of the present invention.
Figure 5:
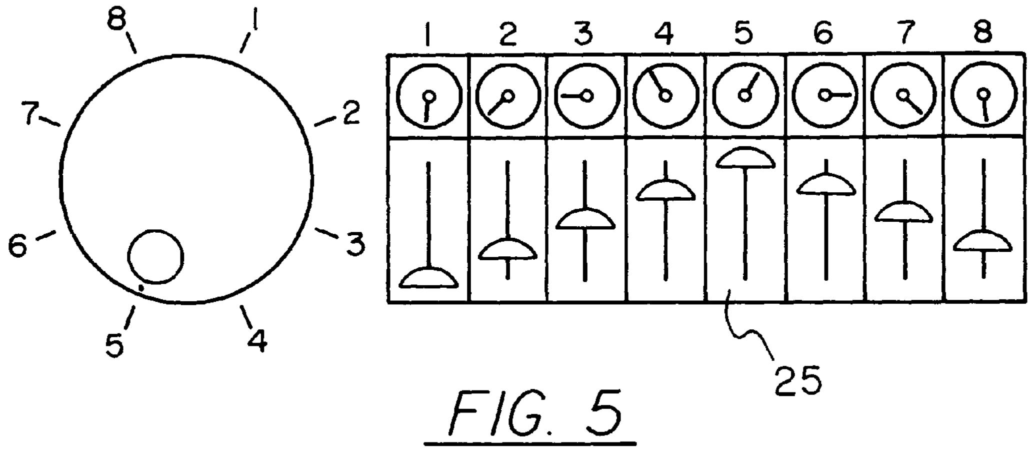
FIG. 5 is a top plan view of a conventional amplifier having eight input channels and eight output channels of the present invention.
Figure 6:
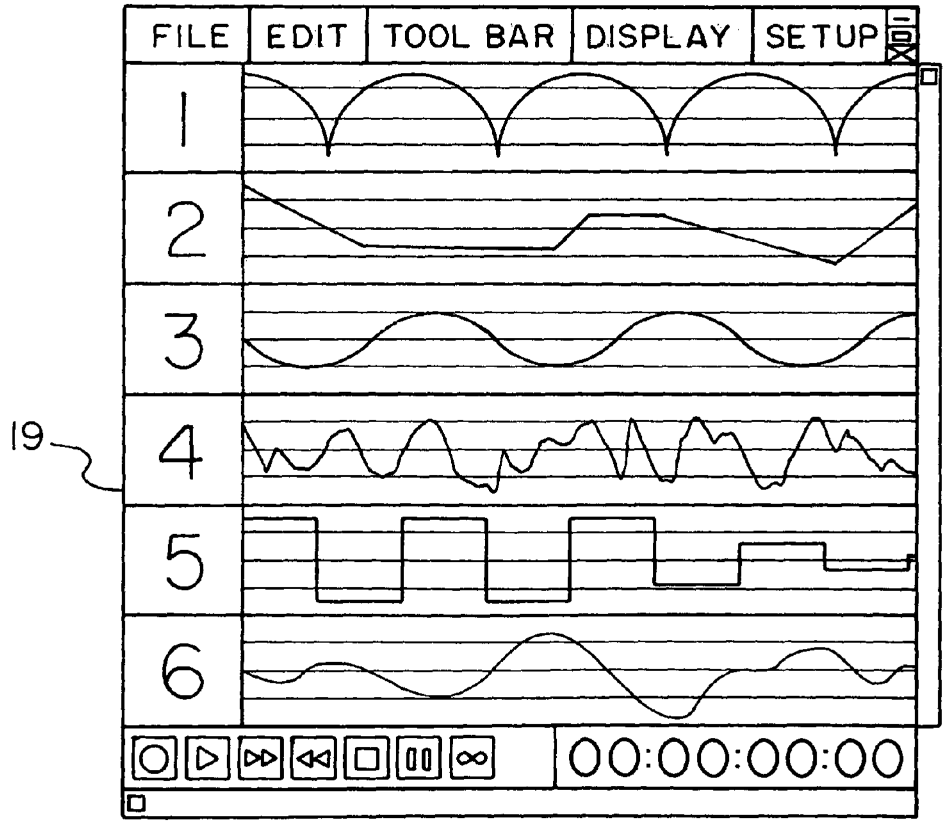
FIG. 6 is an elevational view of a controller connected to the control processing unit of the present invention.
Figure 7:
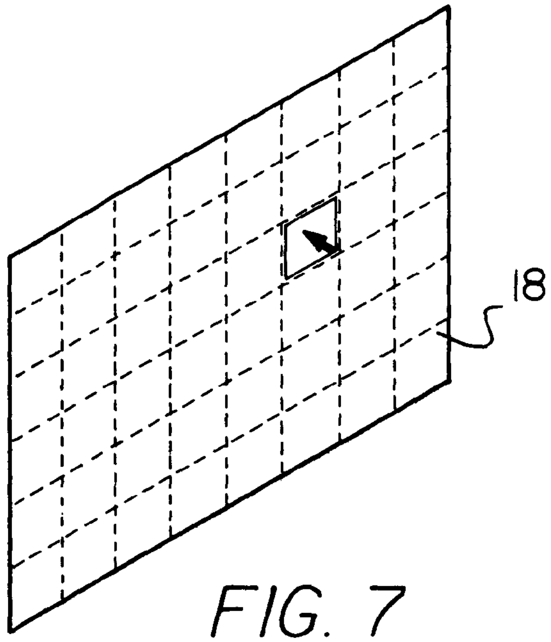
FIG. 7 is perspective view of a monitor of the present invention.
Figure 8:
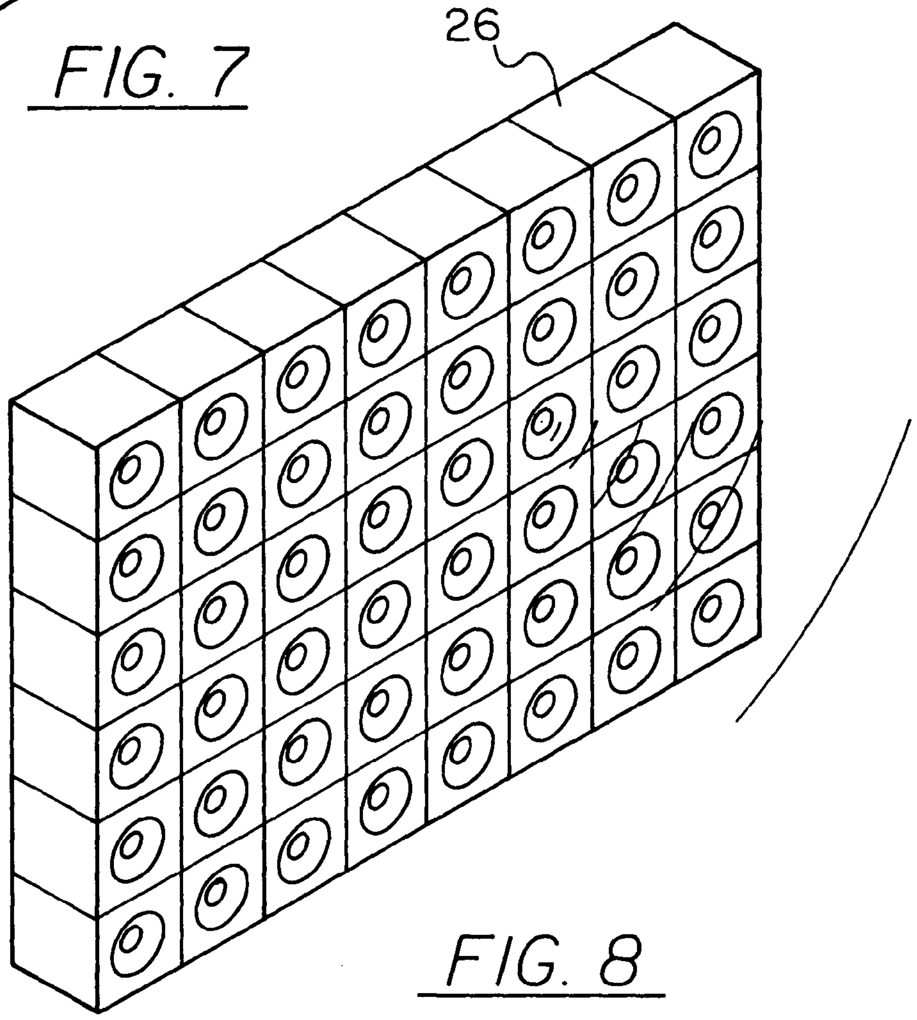
FIG. 8 is a perspective view of the speakers of the present invention.

With reference now to the drawings, and in particular to FIGS. 1 through 18 thereof, a new configurable surround sound system embodying the principles and concepts of the present invention and generally designated by the reference numeral 10 will be described.

As best illustrated in FIGS. 1 through 8, the configurable surround sound system 10 generally comprises a control processing unit 15 including a conventional sound signal converter 21, a plurality of input channels each of which receives a respective sound signal, and a plurality of output channels through which the sound signals can be transmitted as controlled by the computer processing unit 15, the computer processing unit 15 further including computer software which would control the transmitting of sound signals through the output channels to the mixer board 22 in whatever pattern desired by the user. A user interface means is conventionally connected to the control processing unit 15 and includes a keyboard 16 and a mouse 17 and a conventional controller unit 19 which triggers messages to the control processing unit 15 for controlling the transmitting of the sound signals to the speakers 26. A monitor 18 is conventionally connected to the control processing unit 15 for monitoring the transmitting of the sound signals to whatever desired speakers 26. One sound producing means having a plurality of output channels is connected to the control processing unit 15 for creating and transmitting sound signals to the control processing unit 15. The sound signals are then controlled by the computer software and are sent to a mixer board 22 which has a plurality of input and output channels, a plurality of volume control members 23, and a plurality of sound signal positioners 24 which include dials rotatably mounted upon the mixer board 22, each dial controlling a sound signal received in a respective the input channel and also directing a sound signal transmitted to a respective the output channel. From the mixer board 22, the sound signals are transmitted to an amplifier 25 which is conventionally attached to the mixer board 22 and which amplifies the sound signals and transmits them to a plurality of speakers 26 which are connected to the amplifier 25. By being able to control the sound signals, the user is able to create true 3D acoustic effects.

As further illustrated in FIGS. 9 through 18, the conceptual basis of the invention will be further described.

DSP Layer

Figure 9:
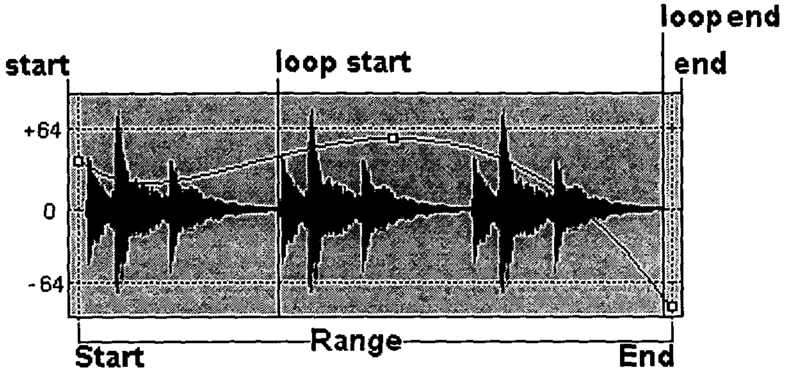
FIG. 9 is a schematic graph of the DSP Layer displaying the sound source and DSP Motion path of a single parameter.
Figure 10:
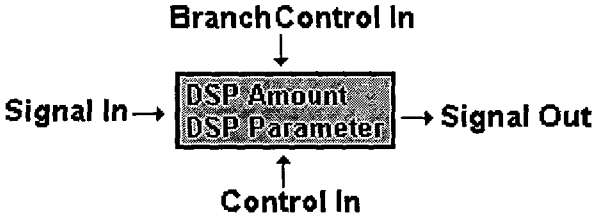
FIG. 10 is a schematic control diagram of a Function within the algorithm of the layer.
Figure 11:
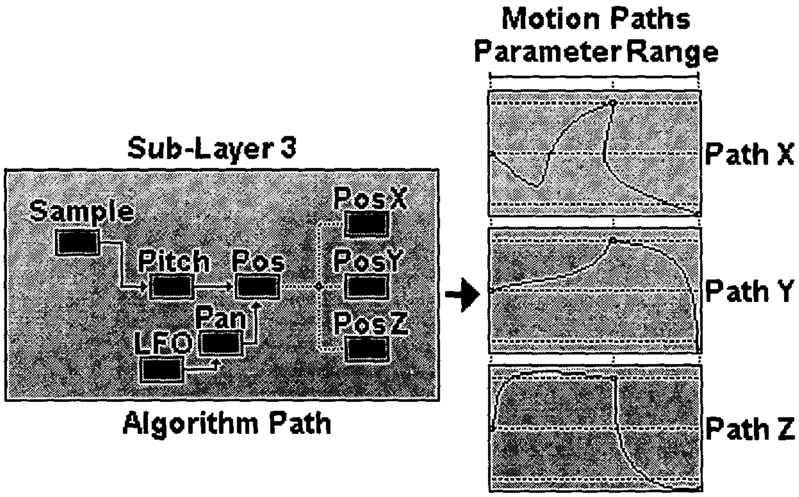
FIG. 11 is a schematic diagram of a sub-layer and a set of motion paths from a branch of the DSP Algorithm of one of the Sub-layers.
Figure 13:
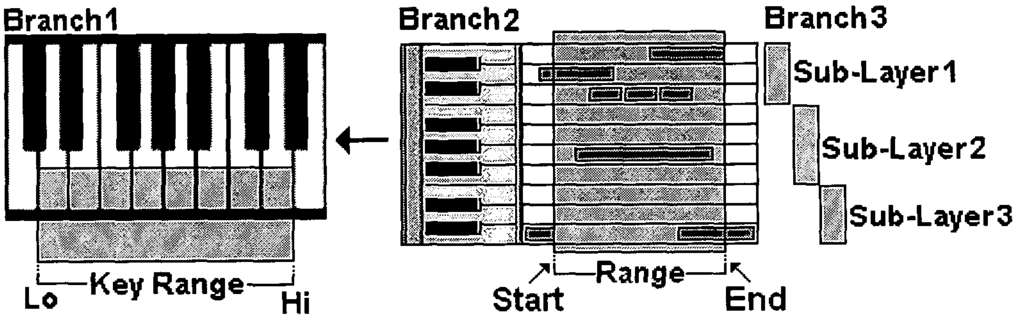
FIG. 13 is a schematic representation of branches employed when a DSP Layer is transposing a selected range of a sequence channel and its corresponding sub layers from note on/off events.
Figure 14:
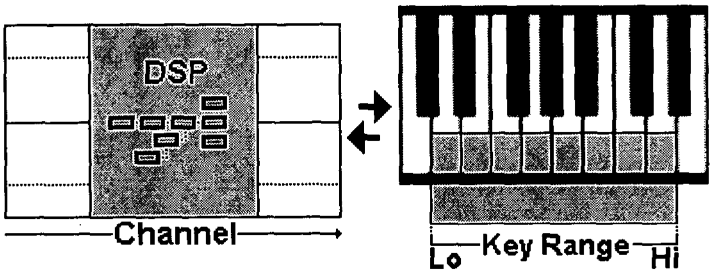
FIG. 14 is a schematic representation of the two different workspaces and how the DSP layer can be dragged into one workspace from another.
Figure 15:
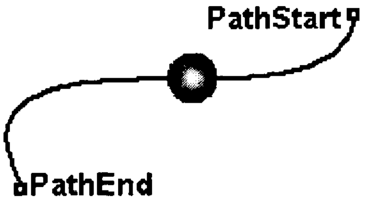
FIG. 15 is a schematic representation of the extent of the path.
Figure 16:
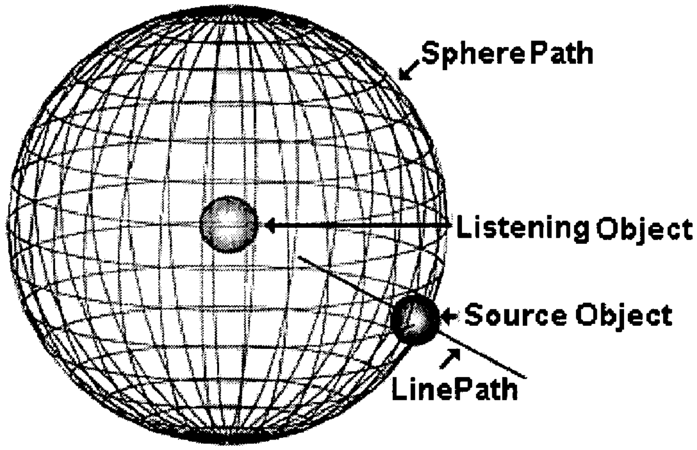
FIG. 16 a schematic representation of a control interface of a sound source object position about a listening object position.

The DSP layer is a high arch structure that floats across a channel and transposes its subsets across a given keyrange of an instrument. It can be as simple as a sample with a DSP parameter motion path (FIG. 9) or as a complex high arch structure of sequences (FIG. 13) with layers of algorithms samples and motion paths (FIG. 11). From a channel it can be dragged and dropped into a keyrange of notes polyphony moving everything it contains; sound sources, algorithms and motion paths, by still allowing you to modify all of the elements at any given time through any work space (FIG. 14). When a sound source is created or imported, a Digital Signal Processing (DSP) layer is automatically generated as its host setting the start, end points and loop start, loop endpoints for the range of playback of that source file (FIG. 9). Each workspace has a different set of tools that control the playback mode. The Source itself has a numeral block ID value following a name and source directory for its parameter value setting which can have a motion path of varying sound sources. Each playback setting is stored into the directory with the source, so when the value selects the source it loads the playback mode of that setting for that layer, as well interpolates the range of subset motion paths to the range of that playback mode. Parameters (volume, pan x, pan y, pan z, etc.) can be selected from a list to become apart of its envelope substructure of motion paths placing the corresponding DSP Functions into a signal flow which forms a DSP algorithm inside the layer.

DSP Algorithm

A DSP Algorithm is a made up functions (FIG. 10) that you assign to the various stages of the signal flow to determine the type of synthesis (Filters, Oscillators, etc.) and control over other functions throughout the branch of the algorithm. Each Function provides a particular set of DSP settings each having motion paths the value follows (FIG. 11). Each value of a parameter can be independently controlled by a midi controller (Pan midi #10, Mod Wheel midi #01, etc.) or internal controller from a list of parameters and functions. It will respond to the transmission of messages from those controllers in creating adjustments of a particular value and can form a motion path over a given range. The units of measurement may differ by the type of function or parameter used, as well as the parameter subsets made available through out the function. The Function can provide an over all amount or feedback over its combined settings, as well parameters can be controlled individually. Placing a controller at various stages of the high branch defines a particular control over the substructure from that point on. All active/passive branches of parameter settings will respond to the controller. If the pan controller is placed as a branch controller; it will position the start to the end of the range of subsets. While a volume Controller can control the amount of all active/passive subset parameters. A controller can be hard wired, external, like a mod wheel which transmits a corresponding midi control # 01 or it can be internal like a LFO. Internal controllers can be active where they run none stop or passive waiting for a note on/off message or the time positioner cursor at the start the range of the layer. You can organize the DSP Functions signal flow from the sound source to the final output through a high arch block schematic; the arrow pointing upward represents the control input of the DSP Function; the arrow pointing downward represents the branch control input of the DSP Function, the arrow pointing to the left is the input of the DSP Function, and the arrow pointing to the right is the output of the DSP Function. Functions and parameters can be turned on to activate the processing effect of the signal and off to bypass the processing effect of the signal.

Adjusting a Range of Subsets

Figure 12:
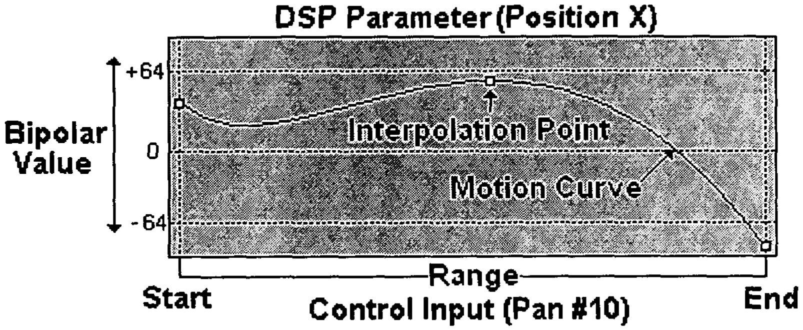
FIG. 12 is a schematic graph of a DSP parameter motion path and the elements used to control the shape of the path by the range of the layer.

Ranges can be selected and adjusted to expand or contract the range of the value substructure through the interval of each value point, a mathematical procedure which estimates values of a parameter at positions between listed or given values by fitting a "curve" to two or more given points, creating a path the value follows (FIG. 12). Click on the curve to add points drag the points to change the shape of the curve. Adjusting the range of the start or end points will adjust the interval between points, adjusting the motion curve. Each parameter has 1 of 2 different value structures unipolar; value from above the original level and bipolar; range from above and below its original level. When adjusting a layer or a subset, the step of the branch within the higher arch of the algorithm determines the subset being adjusted. Each step in the branch controls all subsets from that point on, responding to the adjustment.

Transposing a DSP Layer

Transposing sets sound sources, and motion paths across each note within the keyrange by different pitch (rate) intervals. Higher values increase the interval; lower values decrease it. Low velocity sets the lowest attack velocity at which the layer will be enabled generating the substructure. High velocity sets the highest attack velocity at which the layer will be enabled generating the substructure. The root key number represents the pitch at which the layer will play back without transposition. When dragging a layer into a channel it will playback at its root key. Lo Key sets the lowest active note for the current layer. Hi Key sets the highest active note for the current layer. When a note is triggered it retrieves the information from memory of each layer within that keyrange, transmitting it by note on/off events (FIG. 13).

Workspaces

There are two different workspaces; Channels and Sequence Channels. In a channel mix layers are arranged over multiple channels to a final mix output. While in a Sequence Channel notes with corresponding layers are arranged over a polyphony of channels over a given channel. The design aspects for layers are the same but the control and tools available are different. For example the loop portion of the file over a given channel is different than in a Sequence Channel. In a channel mode the file or loop portion of the layer is pasted, displaying a render of the pre or post portion of the DSP algorithm of the layer, and various tools are made available in pasting each portion of the file as well generating patterns across a channel. In a sequence channel sustained notes pastes the range of each loop portion of the file after for the duration of the note on and off event. Rendering the wave file along the note channels. By doing this the notes can display waveshape of a layer pre or post DSP and play it back at any given point. Allowing more accurate design and control over the workspace, but it doesn't stop there. If a layer is moved onto a channel than the root key (default) will play the layer on the channel without transposition when place back onto a keyrange it restores its transposition. If a note sequence is made along a channel the selected start and end points creating a higher arch layer that can be dragged into the keyrange as a new source. When playing a note in a given keyrange of the sequence it plays the start of the sequence, playing all the subsets layers and their motion paths. When you move a layer you move everything it contains and you can still modify all of the elements in the layer at any given time through the keyrange or dragging it onto a channel modifying it there. You can collapse a given range to a wave file erasing the substructure or render out to a wavefile keeping the substructure in tact. When creating the multichannel mixes or sequences channels and having automation channels, like conventional systems, you can select the range of channels to become a high-arch layer, placing all the channels sound sources and automation into a controllable substructure (FIG. 14).

Positional Controllers

There are two purposes for positional controllers. 1) As an Interface providing specific positional movements through the properties of a shape or geometry in creating a motion path for the source objects position (FIG. 15). 2) Animate specific positional movements actively or passively in response to a note triggered within a given key range of the layer or by the time positioner cursor of channels (FIG. 14). What makes this different is that it is like other DSP Functions in which it generates its own movements and has its own property value settings with motion paths. So it can run continuously by note on/off events (FIG. 13), as well have a controller it responds to. The shape controller can not just control the source object, but also control other shapes. For example; the figure below shows one shape controller (line path), one Geometric controller (sphere), one listening object placed in the center of the sphere and the sound source object placed on the line path. The mouse controls the positioning of the line path along the sphere with a property setting to orientate towards the listening object. The mod wheel (midi # 01) is the controller for the sound source object over the line path. So by moving the mod wheel up or down will position it along the line path creating depth. Moving the mouse will position the line path in 3D space along the properties of the sphere orientating it to the center. In a conventional system the pan pot was to attenuate volume unites of the left and right speaker to create various positions between the speakers. When selecting the pan parameter as a controller arranged at various stages of the algorithm you pan the motion paths the left of the pan is the start and the right is the end. Allowing conventional pan controllers (midi # 10) to pan from one point to another in any position within the motion paths of 3D positions x, y, and z created. Combining the value of each parameter of a given range to equal a single unit measurement to pan along.

Playback Environment

Figure 17:
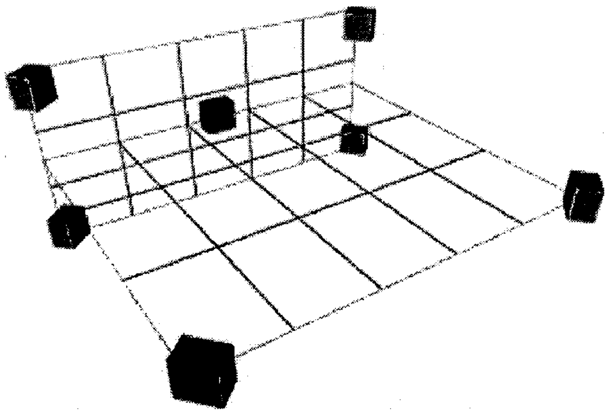
FIG. 17 is a schematic Cartesian representation of a listening space playback model.
Figure 18:
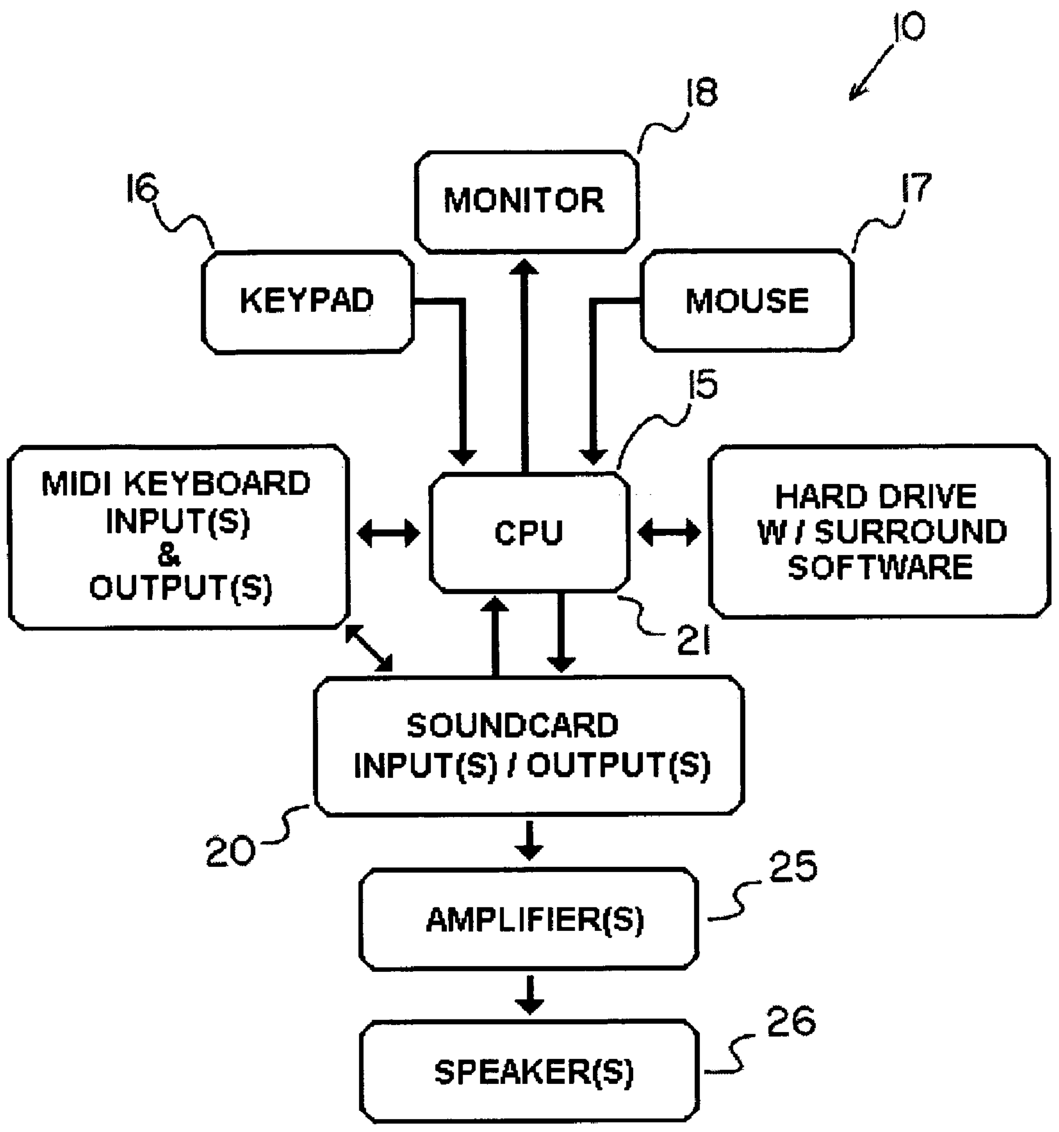
FIG. 18 is a schematic diagram of an optional configurable surround sound system of the present invention.

The playback environment is where information is input into a configuration that processes the playback outputs and render of audio signals to a final mix. When customizing a playback environment various shapes and geometry are used to define the room and speaker/outputs graphical elements. The numbers of speakers are selected, each providing information on its position and orientation in relation to one another and the environment (walls, ceiling and floor). Values are divided amongst each output based on its distance to other outputs in a 3D coordinate array. Calculations are processed based on the positional information of the sound source object in relation to the listening position (FIG. 16) and the proximity of the outputs location in the environment (FIG. 17). The closer to the listening position the louder the source position gets, and as the sound source moves away the quieter it gets, attenuates with distance. The orientation in which it is heard depends on the proximity of a particular speaker within the environment. Each speaker can be individually calibrated (31-band equalizer) to tune the final output of each speaker. The reason for this is each speaker position horizontally or vertically affects the volume level of each frequency. By calibrating each speaker, it allows playback with equal distance to the mix position. Various views and tools like zoom, rotate and position, let the user navigate through three dimensional and two dimensional perspectives.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of creating a reproducing sound in a three dimensional space, comprising:

creating a sound source, including generating a digital signal processing (DSP) layer;

creating a DSP algorithm for the DSP layer of the sound source to create a motion path for the sound source;

creating a curve to represent the motion path;

providing a work space with a set of tools for creating a playback setting to control a playback mode of the sound source;

adjusting a value of a parameter;

providing a positional controller to adjust a position of a source object along one of the motion paths with respect to a listening object;

defining a playback environment with a plurality of sound outputs, including providing information on the position and orientation of each of the sound outputs; and determining a value for each sound output of the plurality of sound outputs based upon the locations and orientations of the sound outputs in the playback environment relative to the source object.

2. The method of claim 1 wherein creating a curve includes providing points on the curve of the motion path when a cursor is clicked on the curve.

3. The method of claim 2 additionally comprising adjusting the curve of the motion path by dragging one of the points on the curve.

4. The method of claim 1 additionally comprising activating one of the DSP functions to activate processing of the sound source or deactivating the one DSP function to bypass processing of the sound source.

5. The method of claim 4 additionally comprising providing an indicator of the DSP function, the indicator comprising an arrow, wherein an indication of the arrow pointing downward represents the branch control input of the DSP function, wherein an indication of the arrow pointing to the left is the input of the DSP function, and the arrow pointing to the right is the output of the DSP function.

6. The method of claim 1 wherein adjusting the value of a parameter includes using a MIDI controller.

7. The method of claim 1 additionally comprising storing the playback setting in a directory with the sound source.

8. The method of claim 7 additionally comprising loading the playback setting from the directory.

9. The method of claim 1 additionally comprising transposing the sound source across a note within a selected keyrange.

10. The method of claim 1 wherein the DSP layer includes start points, end points, loop start point, and loop end points for playback of a source file.

11. The method of claim 1 wherein the DSP algorithm includes DSP functions for a signal flow, each DSP function including DSP settings creating motion paths.

12. The method of claim 1 wherein providing a work space includes selecting parameters from a list of parameters for creating the playback setting, the list of parameters including volume, pan along an X-axis, pan along a Y-axis, and pan along a Z-axis, wherein the work space includes a channels portion and a sequence channels portion.

13. The method of claim 1 wherein creating a curve includes providing points on the curve of the motion path when a cursor is clicked on the curve;

adjusting the curve of the motion path by dragging one of the points on the curve;

activating one of the DSP functions to activate processing of the sound source or deactivating the one DSP function to bypass processing of the sound source;

providing an indicator of the DSP function, the indicator comprising an arrow, wherein an indication of the arrow pointing downward represents the branch control input of the DSP function, wherein an indication of the arrow pointing to the left is the input of the DSP function, and the arrow pointing to the right is the output of the DSP function;

adjusting the value of a parameter includes using a MIDI controller;

storing the playback setting in a directory with the sound source;

loading the playback setting from the directory;

transposing the sound source across a note within a selected keyrange;

wherein the DSP layer includes start points, end points, loop start point, and loop end points for playback of a source file;

wherein the DSP algorithm includes DSP functions for a signal flow, each DSP function including DSP settings creating motion paths; and wherein providing a work space includes selecting parameters from a list of parameters for creating the playback setting, the list of parameters including volume, pan along an X-axis, pan along a Y-axis, and pan along a Z-axis, wherein the work space includes a channels portion and a sequence channels portion.

14. A configurable surround sound system comprising:

a control processing unit including a sound signal converter, a plurality of input channels, and a plurality of output channels, said computer processing unit further including computer software which would control the transmitting of sound signals to said mixer board in whatever pattern desired;

a user interface means connected to said control processing unit, said user interface means including a keyboard, a mouse and controller unit for triggering messages to said control processing unit;

a monitor connected to said control processing unit;

a means for creating and transmitting sound signals connected to said control processing unit and including at least one sound producing means having a plurality of output channels, said sound producing means being connected to said control processing unit;

a means for mixing in sound signals with the sound signals received from said control processing unit including a mixer board having a plurality of input and output channels, a plurality of volume control members, and a plurality of sound signal positioners which include dials rotatably mounted upon said mixer board and, each dial controlling a sound signal received in a respective said input channel and also directing a sound signal transmitted to a respective said output channel;

a means for amplifying the sound signals received from said mixing means; and a plurality of speakers connected to said amplifying means;

wherein said mixing-means includes:

means for creating a sound source, including generating a digital signal processing (DSP) layer;

means for creating a DSP algorithm for the DSP layer of the sound source to create a motion path for the sound source;

means for creating a curve to represent the motion path;

means for providing a work space with a set of tools for creating a playback setting to control a playback mode of the sound source;

means for adjusting a value of a parameter;

means for defining a playback environment with a plurality of sound outputs, including providing information on the position and orientation of each of the sound outputs; and means for determining a value for each sound output of the plurality of sound outputs based upon the locations and orientations of the sound outputs in the playback environment relative to the source object.

* * * * *